INVENTORS
CLARENCE T. CASSADY
RUSSELL V. BOBB

BY *Glenn, Palmer, Matthews & Lyne*
ATTORNEY

United States Patent Office 3,457,760
Patented July 29, 1969

3,457,760
EXTRUSION OF COMPOSITE METAL ARTICLES
Clarence T. Cassady, New Albany, Ind., and Russell V. Bobb, Henrico County, Va., assignors to Reynolds Metals Company, Richmond, Va., a corporation of Delaware
Filed Dec. 16, 1966, Ser. No. 602,247
Int. Cl. B21c 23/22, 25/04, 3/00
U.S. Cl. 72—258                                      2 Claims

ABSTRACT OF THE DISCLOSURE

A solid billet of an inner ingot of a first metal surrounded by an outer ingot of a second metal is extruded through a die to form a composite article. First, the billet is abutted against the rear of the die with the interface between the first and second metals exposed to a wall in the die surrounding an inner die channel and isolating that channel from outer die channels. Then the billet is urged forward, so that the first metal flows through the inner channel and the second metal flows through the outer channels. Finally, the first and second metals merge in a bonding chamber in the die and are extruded through the die orifice to form a composite article wherein the second metal surrounds the first metal.

---

This invention relates to systems for extruding integral elongated composite metal articles from solid composite billet.

In certain applications calling for an elongated metal article, it may be found that no one metal possesses the required properties or characteristics, such as resistance to corrosion, low cost, appearance, conductivity, abrasion resistance, strength, and the like. It is sometimes feasible to overcome this problem by providing that the article be a composite having layers of different metals or alloys integrally bonded together. Another reason for providing such composite metal articles is that a base metal may be galvanically protected by being clad with another metal which is attacked preferentially by the medium in which the article is to be used. The corrosive attack will be thereby confined to the cladding, and will not penetrate into the base.

It is known that elongated composite metal articles may be formed by the extrusion of a solid composite billet with the different metals flowing contiguously from the billet through a common die orifice, but frequently the uncertainties of metal flow patterns make it difficult to control the location in the composite article of the interface between the different metals. Consequently, where one of the metal components is to be relatively thin, a substantial fluctuation of the interface location during extrusion may cause that component to be entirely absent at some places on the finished extrusion, or at least may cause its thickness to vary considerably throughout the extrusion. The problem is compounded where the extrusion is to have a complex shape or where both metal components are to be relatively thin, as in a tube.

The present invention provides methods and apparatus for extruding elongated metal articles from composite billtes, while affording better control over the location of the interface in the finished product. As will become apparent from the following description, such control is achieved by extruding the solid composite billet with such apparatus and in such a manner that the metals, though contiguous in the billet, are separated from each other, directed separately to a region where they may be rejoined without fear of subsequent unacceptably irregular metal flow, bonded together, and finally passed through the extrusion orifice to form the composite article.

For a better understanding of the invention, and of its other details, objects, and advantages, reference is now made to the accompanying drawings, which show, for purposes of illustration only, present preferred embodiments of the invention. In the drawings.

Figure 1:
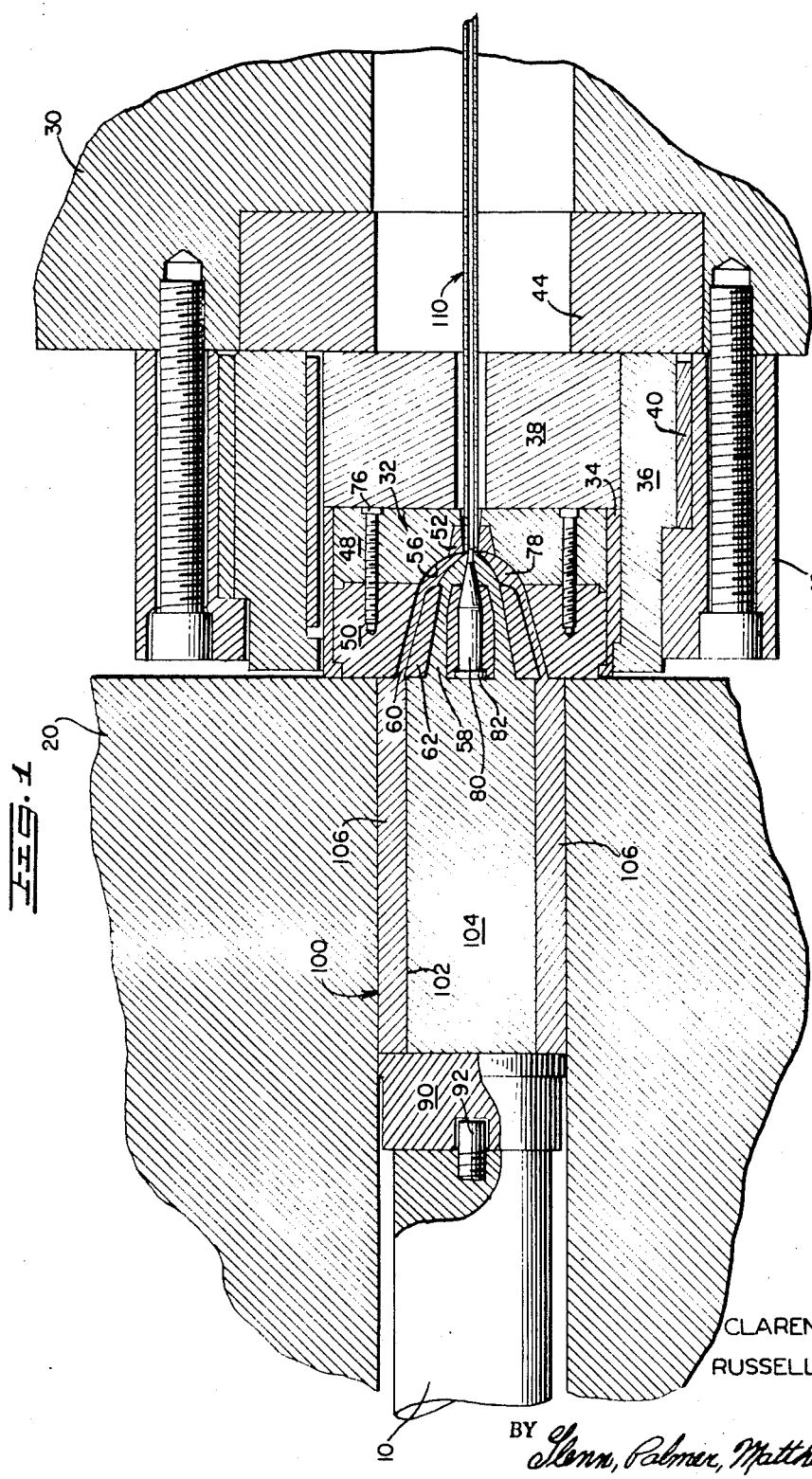
FIGURE 1 is a plan view, predominantly in section, of a portion of an extrusion press extruding a composite billet into a composite tube in accordance with the invention.

Referring now more particularly to the drawings, FIGURE 1 shows a portion of the extrusion press including ram 10 and electrically heated container 20, both of which are independently movable, along a common axis, with respect to stationary front platen 30. The tooling of this particular extrusion press is designed to form composite tube wherein an outer metal component is clad concentrically around an inner metal component, as could for example be used in evaporators or condensers, but it will be understood that various other products may be similarly produced. "Porthole" die 32 made of tool steel is fixedly supported upon platen 30 by a carriage and back-up assembly consisting of die holder 34, die guide 36, bolster 38, wearing plate 40, shifting guide 42, and shear ring 44.

Figure 3:
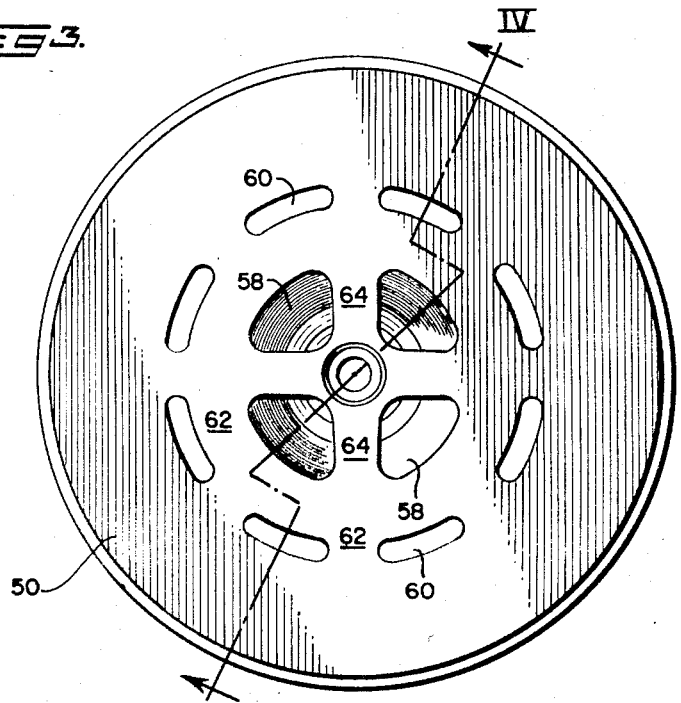
FIGURE 3 is a front view of the extrusion die shown in FIGURE 1.
Figure 4:
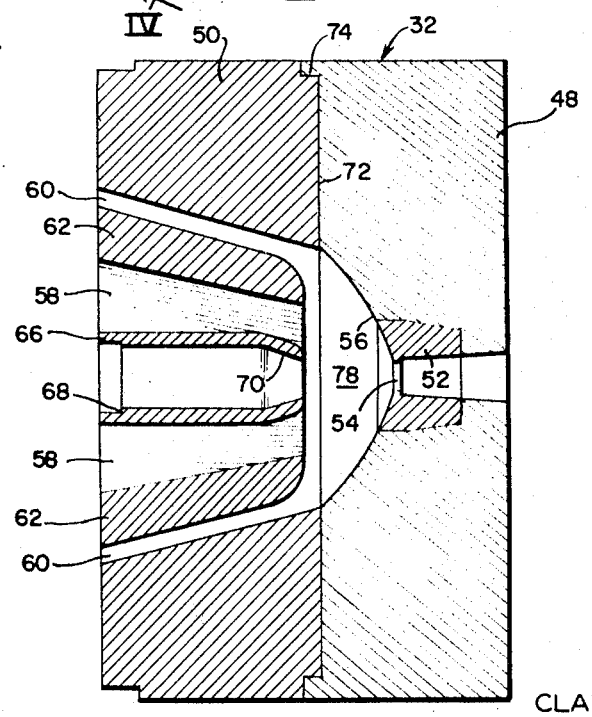
FIGURE 4 is a section taken at IV—IV in FIGURE 3.

For convenience of manufacture and maintenance, die 32 is formed of two parts, front section 48 and rear section 50. As is shown more clearly in FIGURES 3 and 4, die front section 48 contains a tungsten carbide insert 52 defining extrusion orifice 54. The rear surface of die front section 48 and insert 52 form concave wall 56.

Extending through die rear section 50 from its front surface to its rear surface are two concentric groups of "portholes," a group of inner portholes 58 and a group of outer portholes 60, which are separated by solid annular wall 62. Webs 64 between inner portholes 58 emerge at the die axis to form mandrel-carrying sleeve 66 with annular shoulder 68 and conical surface 70 included on its interior surface.

The front surface of rear die section 50 includes a cylindrical projection 72 and the rear surface of die front section 48 an annular rim 74, so that the two surfaces mate. Bolts 76 secure the two sections 48 and 50 together to form the die 32, which may be handled as a separate unit. When the two sections 48 and 50 are disposed together, concave wall 56 is aligned with the outside of outer portholes 60, defining a bonding chamber 78.

Figure 2:
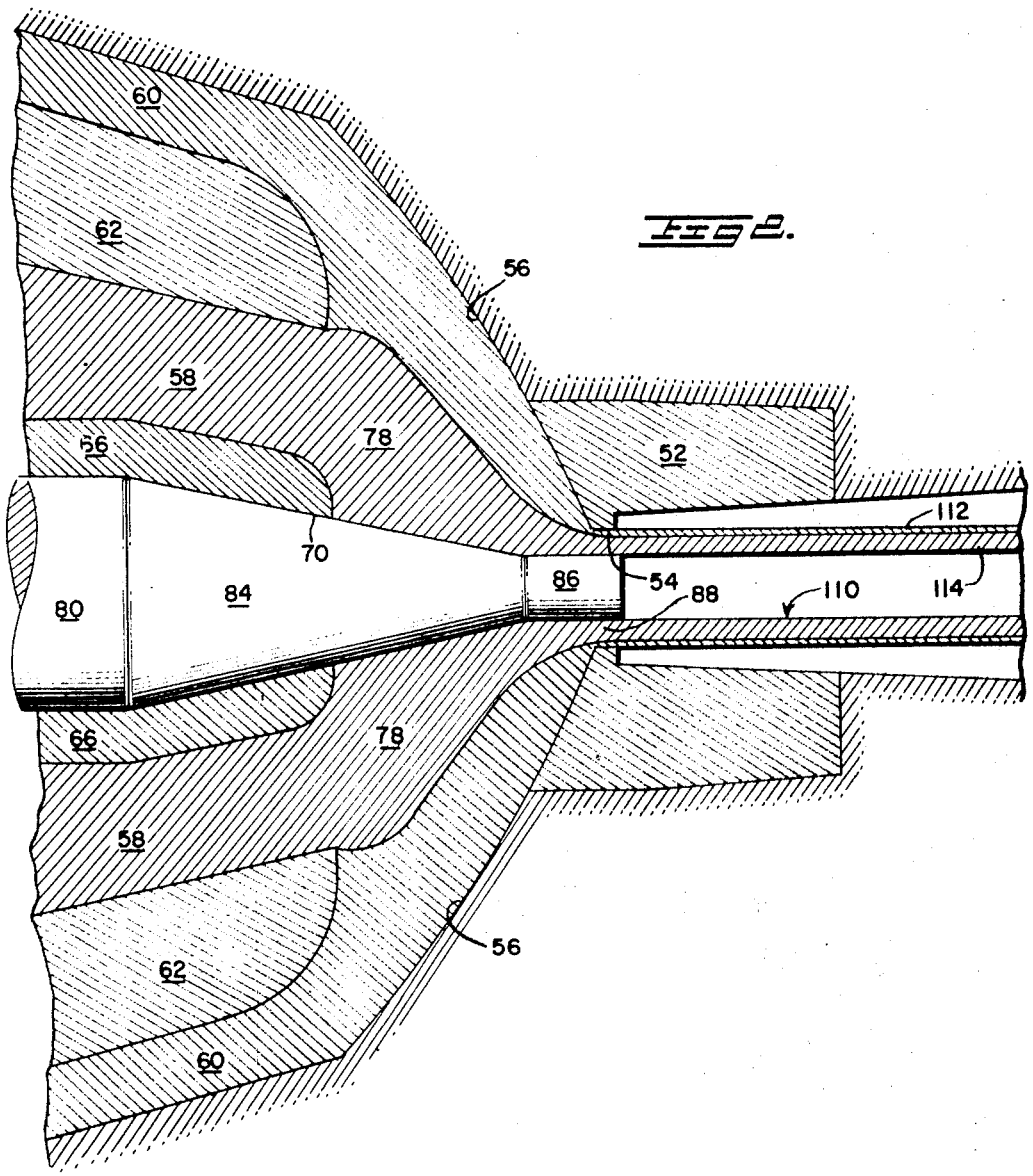
FIGURE 2 is an enlarged detailed view of a portion of FIGURE 1.

As shown in FIGURES 1 and 2, mandrel 80 fits closely within sleeve 66, and has rear lug 82 and conical surface 84 arranged to bear respectively upon shoulder 68 and conical surface 70 of sleeve 66. This centers the male extruding surface 86 formed by the front end of the mandrel 80 in extrusion orifice 54, defining an annular extrusion passage 88, and restrains mandrel 80 from forward movement relative to die 32.

In FIGURE 1 container 20 is show in the extrusion position, urged to seal against the rear face of die 32 by conventional hydraulic pistons and cylinders (not shown). An independent dummy block 90 is centered by stud 92 secured to ram 10, but it will be understood that the dummy block may alternatively be fixed to the ram.

The composite billet employed in the present invention may be formed by first casting a cylindrical inner ingot, allowing it to cool and solidify, and then casting an annular outer ingot around the periphery of the inner ingot. Alternatively, the two ingots may be continuously cast in the same operation, for example, as disclosed in U.S. Patent No. 3,206,808.

In extruding the composite billet into integral elongated composite metal tube in accordance with the invention, the pre-heated billet is elevated by a suitable mechanism (not shown) into alignment with container 20. Ram 10 moves forward, pushing the billet into container 20. Continuing to move forward, ram 10 crushes the billet against die 32 and the inside of container 20, and then extrudes the billet through die 32.

As shown in FIGURES 1 and 2, the billet 100 is disposed so that interface 102 between inner ingot 104 and outer ingot 106 is exposed to solid annular wall 62 between inner portholes 58 and outer portholes 60. Interface 102 therefore does not pass through a single porthole, but instead the metal of inner ingot 104 passes through inner portholes 58 and the metal of outer ingot 106 passes through outer portholes 60, so that the portholes in each group serve as flow-directing channels to guide each metal component from the billet to a designated location within the die. The portholes are inclined inwardly in the forward direction to such a degree that the different metals are kept separated during their period of most severe shear and flow distortion.

The different metals emerge from the faired forward ends of the portholes into bonding chamber 78. There the metal from inner ingot 104 merges circumferentially together, as does the metal from outer ingot 106, and, in addition, the two different metals merge with each other, so that the metal from outer ingot 106 surrounds the metal from inner ingot 104. The metal then flows forward through bonding chamber 78, with the metal from inner ingot 104 flowing over mandrel 80 and both metals decreasing in cross-section under the pressure of extrusion, whereby all the metal becomes bonded and amalgamated but does not become substantially distorted by metal flow irregularities. Finally the metal passes through annular extrusion passage 88, forming an extruded tube 110 with an annular layer 112 of metal from outer ingot 106 intimately clad onto the external periphery of an annulus 114 of metal from inner ingot 104.

It will be understood that the present invention is not necessahily limited to the extrusion of hollow members or of members symmetric with respect to the die axis. For example, where a composite clad angle is desired to be extruded, rear portions of the die may include a single, inner, angle-shaped opening instead of a plurality of inner portholes, and the outer portholes may be spaced about the angle-shaped opening, generally following its outline and being separated therefrom by the solid wall defining the inner opening.

In designing particular systems for practicing the present invention the rollowing ratios of cross sectional area must be kept essentially equal: inner ingot/outer ingot; inner porthole/outer porthole; and, in the extrusion produced, inner metal component/outer metal component.

An exemplary practice of the invention, which is to be regarded only as illustrative and not as limiting, employed an extrusion press according to the foregoing description. The horizontal, self-contained, hydraulic press had a 1250 ton capacity and a container inner diameter of 6.25 inches. The overall thickness of die 32 from front to rear was 5.56 inches, front sections 48 being 2.50 inches thick and rear section 50 being 3.06 inches thick, just inwardly of rim 74. The depth of concave wall 56, taken at the rearward corner of extrusion orifice 54, was 1.00 inch forward of the plane of the flat portion of the rear surface of front section 48, while the diameter of concave wall 56 at its intersection with said flat portion was 3.50 inches. On the rear surface of die rear section 50: the innermost points of inner portholes 58 were 0.63 inch from the die axis; the outermost surfaces of inner portholes 58 were arcs 1.50 inches from the die axis; webs 64 were 0.625 inch thick; the innermost surface of outer portholes 60 were arcs 2.25 inches from the die axis; and the outermost surfaces of outer portholes 60 were arcs 2.50 inches from the die axis. Outer portholes 60, which retained essentially the same cross-section throughout die rear section 50, were inclined inwardly as they passed therethrough, at an angle such that their outermost surfaces were 1.75 inches from the die axis at the front surface of die rear section 50. The outermost surfaces of inner portholes 58 at said front surface were 1.00 inch from the die axis. The diameter of extrusion orifice 54 was 0.375 inch, while the diameter of mandrel male extruding surface 86 was 0.275 inch.

In the example, an inner ingot of 3003 aluminum alloy was cast in the form of a cylinder 4.25 inches in diameter and 54 inches long, and allowed to cool. An outer ingot of 7072 aluminum alloy having a thickness of 0.875 inch was then cast about the peripheral surface of the inner ingot and also allowed to cool. The composite ingot, which had an overall diameter of 6.00 inches and an overall length of 54 inches, was cut into three billets, each being about 18 inches long. Such billets were sequentially preheated in a gas-fired furnace to a temperature of about 1000° F., placed in the container, which was heated to 875° F., and extruded in accordance with the process described above, at a ram speed of approximately 5.5 inches per minute to form composite tubing having an inner diameter of 0.275 inch and an outer diameter of 0.375 inch. The extrusion ratio for each of the two metals was approximately 600.

While present preferred embodiments of the invention have been illustrated and described, it will be understood that the invention may be otherwise variously embodied and practiced within the scope of the following claims.

What is claimed is:

1. A method of making an integral, composite article comprising:
   providing a solid billet of an inner ingot of a first metal surrounded by an outer ingot of a second metal,
   locating said billet in a container of an extrusion press having a die whose inner surfaces define, in communication from front to rear: an extruding orifice, a bonding chamber, and flow-directing channels which include at least one inner flow-directing channel and a plurality of outer flow-directing channels surrounding said inner channel and isolated therefrom by a solid wall also surrounding said inner channel.
   abutting said billet against the rear of said die with the front end of the interface between said inner and outer ingots exposed to and only to said solid wall, and
   urging said billet forward relative to said die, whereby said first metal flows through said inner flow-directing channels, said second metal flows through said outer flow-directing channels and said first and second metals merge in said bonding chamber and are extruded through said orifice to form said integral, composite article with said second metal surrounding said first metal.

2. The method of claim 1 wherein said first and second metals are extruded over a male extruding surface disposed within said orifice so that said article is a tube of said first metal clad with said second metal.

References Cited

UNITED STATES PATENTS

| | | | |
|---|---|---|---|
| 2,638,213 | 5/1953 | Clark | 72—269 |
| 3,021,004 | 2/1962 | Erbsloh et al. | 72—467 X |
| 3,095,973 | 7/1963 | De Buigne | 72—258 X |
| 3,118,180 | 1/1964 | Nalle | 18—13 X |
| 3,285,786 | 11/1966 | Katz | 72—258 X |
| 3,308,508 | 4/1967 | Schrenk | 18—13 |

MILTON S. MEHR, Primary Examiner

U.S. Cl. X.R.

72—269, 467